United States Patent
Downs

(10) Patent No.: US 7,114,733 B2
(45) Date of Patent: Oct. 3, 2006

(54) MOBILE WORK AND SUPPLY STATION WITH CRANE EYELETS AND BLUEPRINT DESK

(76) Inventor: Ira Downs, 1070 Gay Winds Dr., Mt. Juliet, TN (US) 37122

( * ) Notice: Subject to any disclaimer, the term of this patent is extended or adjusted under 35 U.S.C. 154(b) by 201 days.

(21) Appl. No.: 10/926,347

(22) Filed: Aug. 26, 2004

(65) Prior Publication Data

US 2006/0043687 A1   Mar. 2, 2006

(51) Int. Cl.
 *E06B 1/00* (2006.01)
(52) U.S. Cl. ............... 280/47.35; 280/79.3; 312/321.5; 312/194; 312/196
(58) Field of Classification Search ............. 280/47.35, 280/79.3; 211/70.6, 94.02, 162; 312/321.5, 312/194, 196
See application file for complete search history.

(56) References Cited

U.S. PATENT DOCUMENTS

| | | | |
|---|---|---|---|
| 2,905,480 A | 9/1959 | Giovannelli | 280/34 |
| 2,964,328 A | 12/1960 | Muir | 280/47.19 |
| 3,118,685 A | 1/1964 | Jordan | 280/47.19 |
| 3,771,848 A | 11/1973 | Claywell | 312/250 |
| 4,120,549 A | 10/1978 | Bureau | 312/253 |
| 4,288,134 A | 9/1981 | Knaack et al. | 312/290 |
| 4,733,703 A | 3/1988 | Cimino | 144/285 |
| 4,743,040 A | 5/1988 | Breveglieri et al. | 280/47.35 |
| 4,976,450 A | 12/1990 | Ellefson | 280/79.11 |
| 5,224,531 A | 7/1993 | Blohm | 144/285 |
| 5,378,005 A | 1/1995 | Norton | 280/47.26 |
| 5,452,908 A | 9/1995 | Bencic | 280/47.35 |
| 5,558,418 A * | 9/1996 | Lambright et al. | 312/321.5 |
| 5,566,961 A | 10/1996 | Snell et al. | 280/47.35 |
| 5,588,659 A | 12/1996 | Boes et al. | 280/47.19 |
| 5,634,649 A | 6/1997 | Breining et al. | 280/47.35 |
| 5,642,898 A | 7/1997 | Wise | 280/652 |
| 5,725,037 A | 3/1998 | Faulhaber | 144/285 |
| 5,820,238 A * | 10/1998 | Lambright | 312/291 |
| 6,022,033 A * | 2/2000 | Landesman et al. | 280/47.35 |
| 6,086,073 A | 7/2000 | Tisbo et al. | 280/47.26 |
| 2001/0045718 A1 | 11/2001 | Boirum | 280/47.26 |

* cited by examiner

*Primary Examiner*—Christopher P. Ellis
*Assistant Examiner*—Cynthia F. Collado
(74) *Attorney, Agent, or Firm*—Richard C. Litman

(57) ABSTRACT

A mobile work and supply station, to hold and transport tools and building materials. The mobile work and supply station has a generally rectangular cart frame, a center section set within the generally rectangular cart frame, a top shelf running across the top of the generally rectangular cart frame, a horizontal shelf running across the top of the center section, a hinged foldable desk table in the front facing of the center section, a plurality of locking wheels, a plurality of eyelets on the top ends of the four vertical legs to accommodate a lifting device, a plurality of hollow cylindrical tubes to hold any elongated tools, building materials and blueprints and a plurality of containers within the center section for holding the tools and building materials.

10 Claims, 4 Drawing Sheets

MOBILE WORK AND SUPPLY STATION WITH CRANE EYELETS AND BLUEPRINT DESK

BACKGROUND OF THE INVENTION

1. Field of the Invention

The present invention relates to a portable building contractor's work and supply station. More particularly, the work and supply station is provided with a foldable blueprint desk and crane eyelets to lift the work and supply station in a multiple story worksite.

2. Description of the Related Art

Having the right workstation and tools are important for any type of building contractor in order to do any work safely and correctly. Having a mobile workstation that can hold and organize a contractor's equipment and supplies helps the contractor to stay organized and be efficient. There are many such workstations that are well-known and are reflected in the related art.

U.S. Patent Application Publication No. 2001/0045718 published on Nov. 29, 2001, outlines the use of a multiple function jobsite work cart in which the basic component is a wheel-based cart having a base, two opposing sides perpendicular to the base and is capable of being rolled in a horizontal or vertical orientation. With the incorporation of additional components including dividers, steps, a door, frames, outriggers, stabilizing bars, brackets and others, the cart can be configured as a materials cart, wheelbarrow, storage cart, scaffold, ladder, dolly, sheet support and other structures useful in a working jobsite setting.

U.S. Pat. No. 2,905,480 issued to Giovannelli on Sep. 22, 1959, outlines the use of a portable carry-all cart, which can be easily converted for a variety of different purposes. The portable carry-all cart has a plurality of hinged compartments on its top and sides, is easy to assemble and disassemble and is wheeled for mobility.

U.S. Pat. No. 2,964,328 issued to Muir on Dec. 13, 1960, outlines the use of a cart for conveniently transporting, storing and supporting a variety of hand tools such as those employed by millwrights, plumbers and automotive mechanics.

U.S. Pat. No. 3,118,685 issued to Jordan on Jan. 21, 1964, outlines the use of a carpentry accessory that more particularly relates to a combination tool chest and workbench that can be moved from place to place.

U.S. Pat. No. 3,771,848 issued to Claywell on Nov. 13, 1973, outlines the use of a portable tool chest having a tool storage facility mounted within a storage cabinet and a work bench connectable to the cabinet so as to act as a closure when the chest is being transported or engaged in performing work in relation to the cabinet.

U.S. Pat. No. 4,120,549 issued to Bureau on Oct. 17, 1978, outlines the use of a support for elevating a tool chest to a spaced distance above the level of a work-bench area of a roll-around cabinet. The roll-around cabinet is provided with a hollow shell defined by an upstanding front wall, rear wall and a pair of sidewalls, all of uniform height and made of sheet material. Angle irons are also secured peripherally around the upper inside of the walls to receive and seat the bottom of the tool chest.

U.S. Pat. No. 4,288,134 issued to Knaack et al. on Sep. 8, 1981, outlines the use of a storage cabinet usable for the storage of tools and other equipment at a desired location such as a jobsite, with the cabinet having improved structure for strength, security against theft, ease of packaging and shipment and improved utility.

U.S. Pat. No. 4,733,703 issued to Cimino on Mar. 29, 1988, outlines the use of a combination workbench and tool-chest. The structure includes a working surface supported by a rigid frame. Tool storage provisions include pegboards, shelves and drawers that are mounted on the rigid frame. A set of removable security panels is mounted in grooves or tracks in the frame to enclose the sides of the frame and tools. When the panels are in place, they interact with each other so that only one lock is needed to secure all of the sides of the bench.

U.S. Pat. No. 4,743,040 issued to Breveglieri et al. on May 10, 1988, outlines the use of a wheeled movable cart for the transport of cleaning utensils. The wheeled movable cart can be used by a cleaning person to efficiently carry any necessary implements needed for normal cleaning duties.

U.S. Pat. No. 4,976,450 issued to Ellefson on Dec. 11, 1990, outlines the use of a mechanic's tool chest with a plurality of cantilevered horizontal pivotal tool trays mounted on the chest with a plurality of drawers enclosed within inwardly recessed top, rear, and side panels. The tool trays are pivotally mounted on posts, which are vertically extendible from the corners of the chest for positioning tool trays in an elevated position over vehicle fenders or similar structures.

U.S. Pat. No. 5,224,531 issued to Blohm on Jul. 6, 1993, outlines the use of a portable apparatus for storing tools in an organized fashion and which also converts to a combination saw table, router table and workbench. The apparatus can be readily maneuvered, loaded into a truck bed and stored when folded. It also provides a rigid work surface with easy tool access when in the set-up position.

U.S. Pat. No. 5,378,005 issued to Norton on Jan. 3, 1995, outlines the use of a portable tool truck with a molded plastic body with a compartment formed in the front face of the body which is adapted to retain tools therein. A first door is mounted at one side of the body and a second door is mounted at the opposite side of the body. The doors pivot in opposite directions into an overlapping arrangement that seals off the compartment. Numerous tool storage pockets, slots and apertures are defined in the tool truck body and in the faces of both doors to retain a plethora of diverse tools from within.

U.S. Pat. No. 5,452,908 issued to Bencic on Sep. 26, 1995, outlines the use of a collapsible work stowage cart with a storage chest for holding work equipment therein. A toolbox is on the storage chest for carrying hand-tools. A foldable worktable is also on the storage chest at which manual work is done. A structure is provided for moving the storage chest along a generally flat horizontal surface, when the cart is changed from a working mode into a transporting mode.

U.S. Pat. No. 5,566,961 issued to Snell et al. on Oct. 22, 1996, outlines the use of a modular storage unit that includes a plurality of shelf components having a bottom portion and at least one upstanding shelf end wall. The components are removably secured together by a plurality of flanges and a plurality of flange receiving slots. The plurality of flanges and the plurality of flange receiving slots are individually and selectively formed in the shelf components.

U.S. Pat. No. 5,588,659 issued to Boes et al. on Dec. 31, 1996, outlines the use of a tool cart generally in the form of an upright stand provided with unique structural features to enable a large number of tools to be supported in an accessible position. The stand includes a pair of wheels, which do not engage a supporting surface, when the stand is upright, but do engage a supporting surface when the stand is tilted to provide a mobile cart that can be easily moved to a site of use of the tools supported by the cart.

U.S. Pat. No. 5,634,649 issued to Breining et al. on Jun. 3, 1997, outlines the use of an apparatus for making available tools and materials that contain a frame, which is formed from a lower frame element and uprights fixed thereto. Closed storage containers for tools and materials can be individually fitted to the frame. The storage containers can be matched to the specific use. The apparatus contains at least three bearing points, which are preferably formed by rolls or wheels.

U.S. Pat. No. 5,642,898 issued to Wise on Jul. 1, 1997, outlines the use of a tool cart designed and configured to receive a number of diverse accessories. The steel frame of the tool cart is fully machined and has a powder coating. Numerous pre-existing holes in the frame allow the consumer to select a wide number of accessories for the cart. This permits the consumer to adapt the cart to fit his or her special needs. The tool cart also includes a bolted on toolbox for storing and securing tools and a power strip for providing electricity to the various accessories.

U.S. Pat. No. 5,725,037 issued to Faulhaber on Mar. 10, 1998, outlines the use of a multi-functional portable workshop that serves as a tool storage box in combination with a workbench. This invention not only provides safe tool storage from thieves, but also provides several highly advantageous work surfaces and is readily portable as well. Along with providing several work surfaces, this tool storage box also provides ways in which other useful tools and devices can be attached to the external surface of the tool storage box.

U.S. Pat. No. 6,086,073 issued to Tisbo et al. issued on Jul. 11, 2000, outlines the use of a portable work center that is formed from molded plastic panels having reinforced steel corner posts and a tool-storage worktop. A plurality of swing doors and storage compartments compliment the portable work center.

Although each of these patents and publications outline the use of novel and useful workstations, what is really needed is a provision to allow a contractor to use a crane or other lifting device to carry a workstation from building floor to building floor and or use a building's elevators as the unit is designed to fit in a building elevator to accommodate removal of the unit from floor to floor during renovations and new construction while working on a building with multiple building floors. Such a workstation would address a need that many contractors and subcontractors have currently while working on multiple story projects.

None of the above inventions and patents, taken either singly or in combination, is seen to describe the instant invention as claimed. Thus a mobile supply unit and blueprint desk solving the aforementioned problems is desired.

SUMMARY OF THE INVENTION

The invention is a mobile work and supply station, to hold and transport tools and building materials. The mobile work and supply station has a generally rectangular cart frame, a center section set within the generally rectangular cart frame, a top shelf running across the top of the generally rectangular cart frame, a horizontal shelf running across the top of the center section, a hinged foldable desk table in the front facing of the center section, a plurality of locking wheels, a plurality of eyelets on the top ends of the four vertical legs to accommodate a lifting device, a plurality of hollow cylindrical tubes to hold any elongated tools, building materials and blueprints and a plurality of containers within the center section for holding the tools and building materials.

Accordingly, it is a principal object of the invention to provide a work and supply station that can be lifted to elevated floors during construction by a lifting device.

It is another object of the invention to provide a work and supply station with a foldable and retractable blueprint desk.

It is a further object of the invention to provide a work and supply station that can easily carry and hold elongated conduit and thread rods as well as other elongated materials.

Still another object of the invention is to provide a mobile work and supply station.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
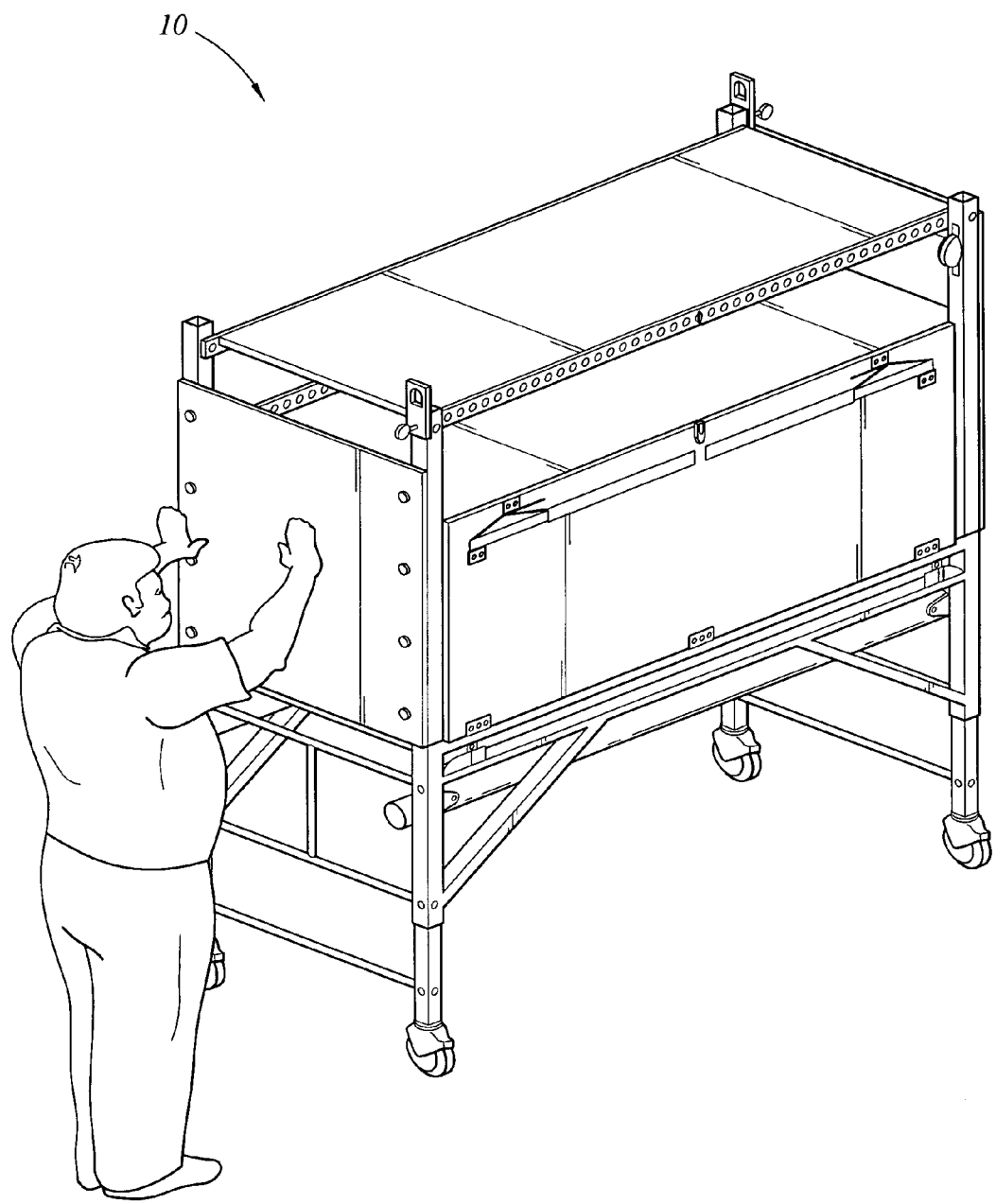
FIG. 1 is an environmental perspective view of a mobile work and supply station.

The present invention is a mobile work and supply station 10 to hold and transport tools and building materials, as is depicted in FIG. 1.

The mobile work and supply station 10 comprises a generally rectangular cart frame 20 with a bottom 22, a top 24 and four corners 26, four vertical legs 30 in each corner 26 of the generally rectangular cart frame 20 with top ends 32 and bottom ends 34, a center section 40 with a front facing 41, a back wall 42, two permanent side panels 43, a top 44 and a bottom 45 set within the generally rectangular cart frame 20, a top shelf 50 running across the top 24 of the generally rectangular cart frame 20 and a horizontal shelf 60 running across the top 44 of the center section 40.

Figure 2:
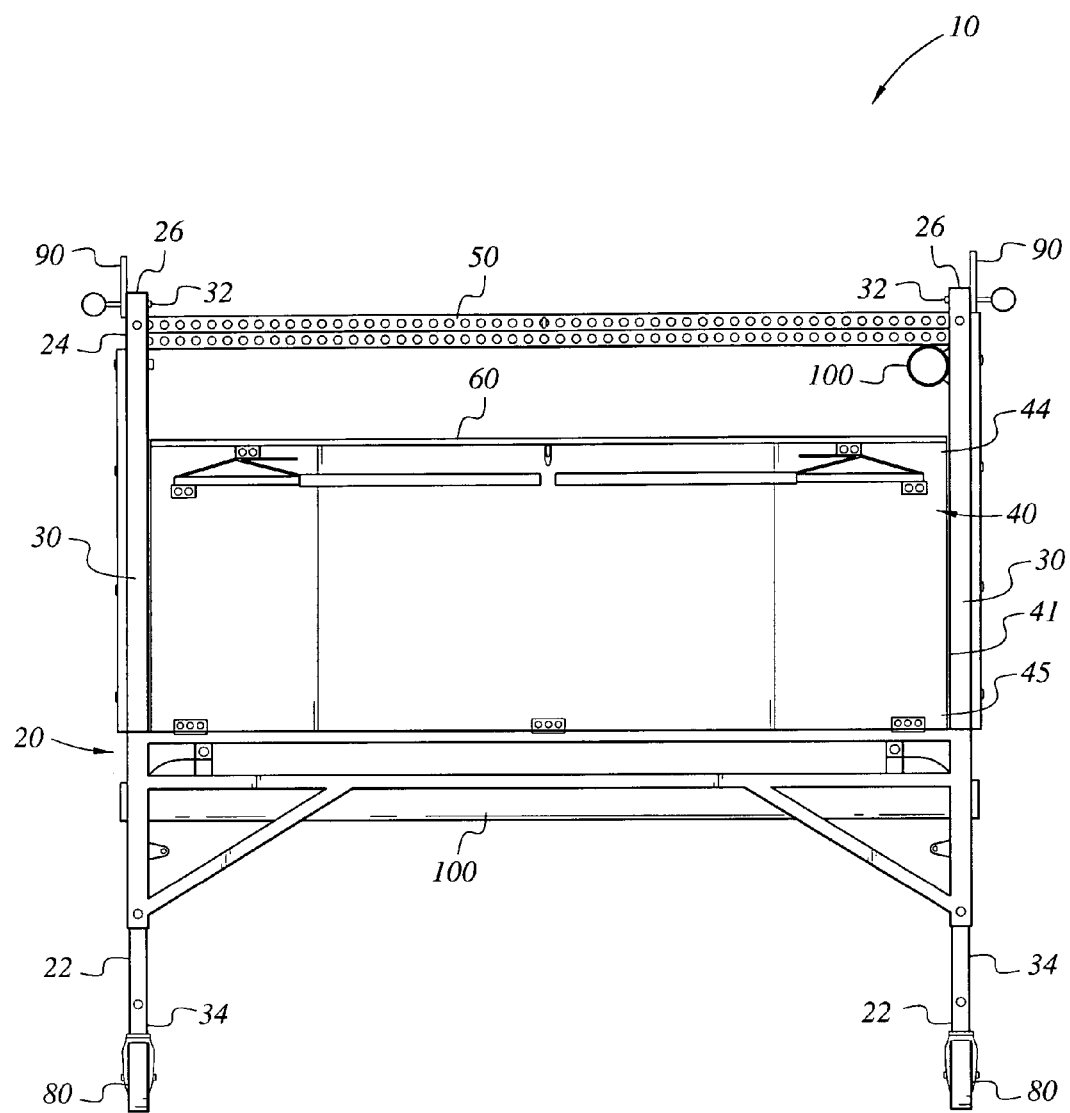
FIG. 2 is a front perspective view of a mobile work and supply station in a closed position.

The mobile work and supply station 10 further comprises a hinged foldable desk table 70 in the front facing 41 position of the center section 40, a plurality of locking wheels 80 on the bottom ends 34 of the four vertical legs 30 to transport the mobile work and supply station 10, a plurality of eyelets 90 on the top ends 32 of the four vertical legs 30 to accommodate a crane or other lifting device (not shown) to lift the mobile work and supply station 10, a plurality of hollow cylindrical tubes 100 to hold any elongated tools, building materials and blueprints (not shown) and a plurality of containers 110 within the center section 40 for holding the tools and building materials. All of these features of the mobile work and supply station 10 are depicted in FIG. 2 and FIG. 3.

The generally rectangular cart frame 20 of the mobile work and supply station 10 is made of steel for strength and durability. As is depicted in FIG. 2, the mobile work and supply station 10 and its hinged foldable desk table 70 can be folded-up to form a wall on the front facing 41 of the center section 40. A lock (not shown) can be disposed on the hinged foldable desk table 70 for added security. The plurality of eyelets 90 is also provided to allow a crane or other lifting device (not shown) to lift the mobile work and supply station 10 from a level floor to an upper floor, as is frequently done with the construction of large multi-story concrete buildings. The mobile work and supply station 10 also has a plurality of hollow cylindrical tubes 100 that are disposed underneath the center section 40 for the storage of elongated tools and materials that are frequently used by electrical contractors and mechanical contractors.

Figure 3:
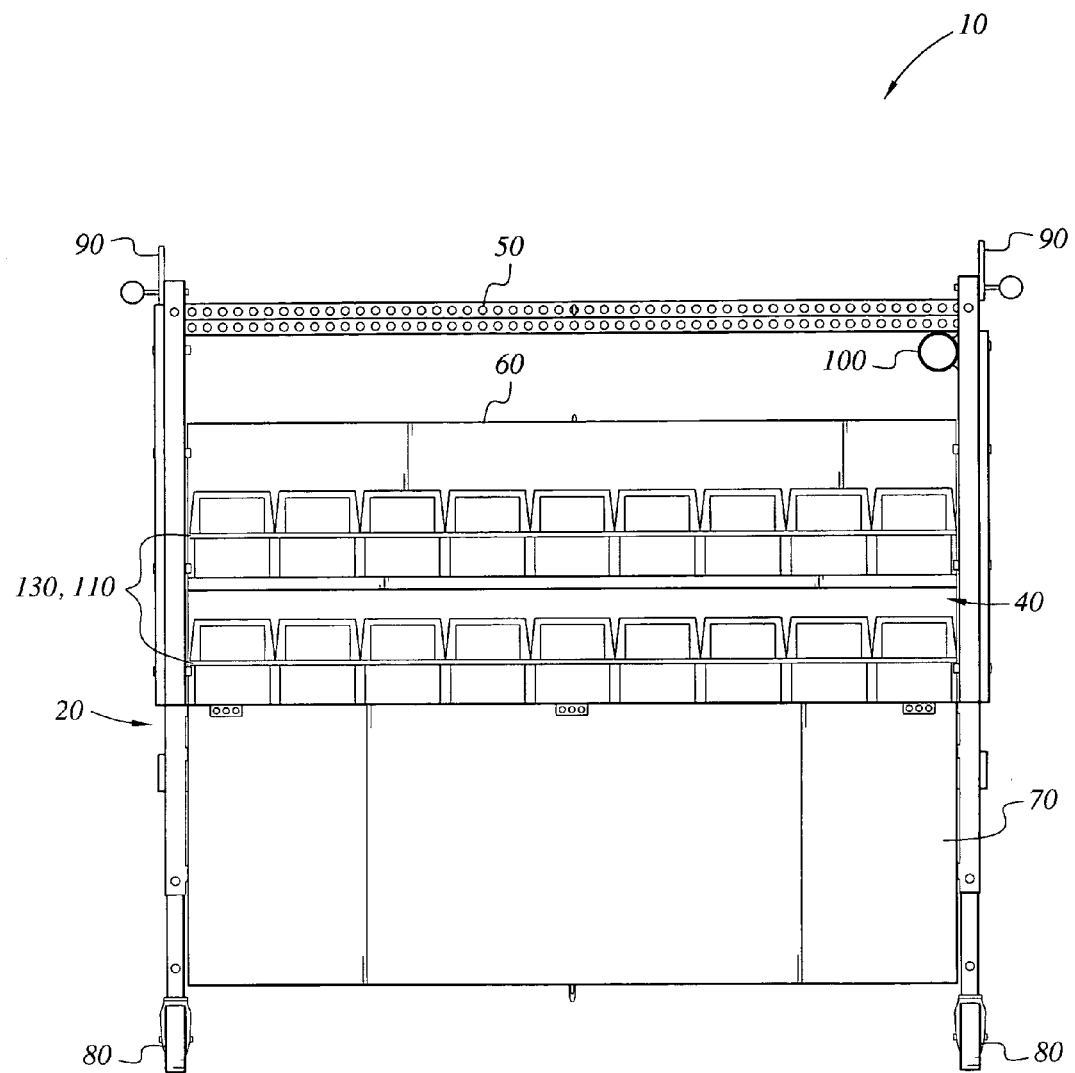
FIG. 3 is a front perspective view of a mobile work and supply station in an open position.

As is shown specifically in FIG. 3, a plurality of containers 110 in the form of slidable drawers 130 is disposed within the center section 40. Note that the hinged foldable desk table 70 is in a downward position, thereby exposing the slidable drawers 130. The slidable drawers 130 are designed to hold small tools and supplies (not shown) and have a plurality of hollow cylindrical tubes 100 disposed inside of the center section 40 that is also designed to hold blueprints for a person that would use the hinged foldable desk table 70.

Figure 4:
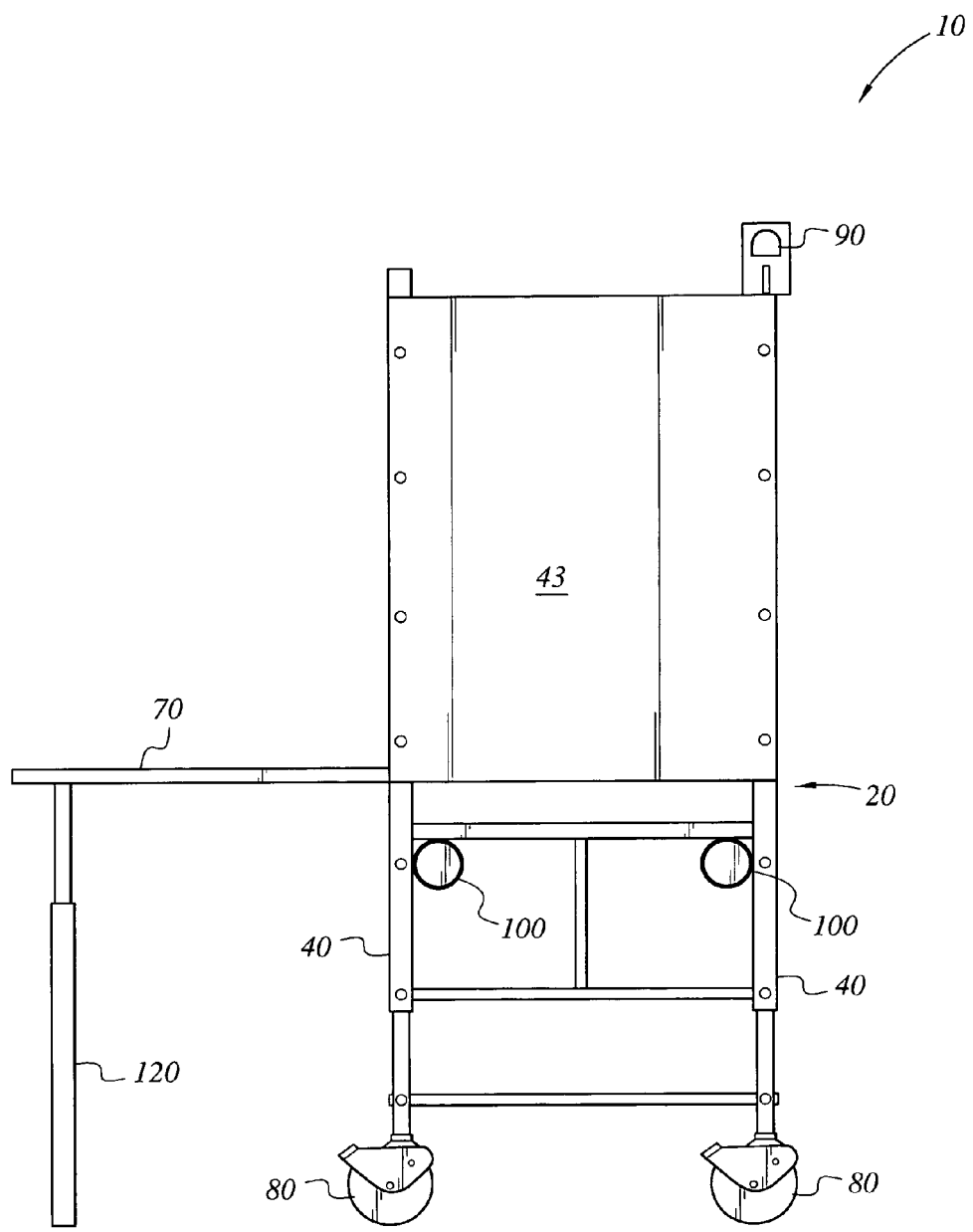
FIG. 4 is a side perspective view of a mobile work and supply station with its foldable blueprint desk being opened.

FIG. 4 illustrates the hinged foldable desk table 70 unfolded into its usable position. This entails folding down the foldable leg support 120 stowed against the hinged foldable desk table 70. While using the hinged foldable desk table 70, the plurality of locking wheels 80 can also be placed in a locked position to secure the mobile work and supply station 10 while in use.

Use of the mobile work and supply station 10 is straightforward. The mobile work and supply station 10 is small and light enough to have a single person push it into position. The mobile work and supply station 10 is also compact enough to fit inside of an elevator for transport. The hinged foldable desk table 70 can be manually folded out into a desktop position for use to conveniently allow a user to review blueprints on the jobsite. The mobile work and supply station 10 conveniently centralizes the storage of building materials and tools that a worker may need to use on the jobsite, as well as keep tools and supplies off of the jobsite floor.

The mobile work and supply station 10 is approximately 6'-7" high and 6'-2" in width, with the hinged foldable desk table 70 being approximately 5'-10" wide. It is made of durable steel and thermoplastics that allow for durability and easy transport and positioning.

It is to be understood that the present invention is not limited to the embodiment described above, but encompasses any and all embodiments within the scope of the following claims.

I claim:

1. A mobile work and supply station, to hold and transport tools and building materials, comprising:

a generally rectangular cart frame with a bottom, a top and four corners;

four vertical legs in each corner of the generally rectangular cart frame with top ends and bottom ends;

a center section with a front facing, a back wall, two permanent side panels, a top and a bottom set within the generally rectangular cart frame;

a top shelf running across the top of the generally rectangular cart frame;

a horizontal shelf running across the top of the center section;

a hinged foldable desk table in the front facing of the center section which can be folded outward and used as a desktop;

a plurality of locking wheels on the bottom ends of the four vertical legs to transport the mobile work and supply station;

a plurality of eyelets on the top ends of the four vertical legs to accommodate a lifting device to lift the mobile contractor's work and supply station;

a plurality of hollow cylindrical tubes to hold any elongated tools, building materials and blueprints; and a plurality of containers within the center section for holding the tools and building materials.

2. The mobile work and supply station according to claim 1, wherein the generally rectangular cart frame is made of steel.

3. The mobile work and supply station according to claim 1, wherein the hinged foldable desk table can be folded-up to form a wall on the front facing of the center section.

4. The mobile work and supply station according to claim 1, wherein a lock can be disposed on the hinged foldable desk table.

5. The mobile work and supply station according to claim 1, wherein the lifting device can lift the mobile work and supply station from a level floor to an upper floor.

6. The mobile work and supply station according to claim 1, wherein the plurality of hollow cylindrical tubes are disposed underneath the center section.

7. The mobile work and supply station according to claim 1, wherein the plurality of hollow cylindrical tubes are disposed underneath the center section.

8. The mobile work and supply station according to claim 1, wherein one of the plurality of hollow cylindrical tubes is disposed inside of the center section.

9. The mobile work and supply station according to claim 1, wherein one of the plurality of hollow cylindrical tubes is disposed inside of the center section.

10. The mobile work and supply station according to claim 1, wherein the plurality of containers are slidable drawers.

* * * * *